A. ROELOFS.
Improvement in Curtain-Fixtures.
No. 129,172. Patented July 16, 1872.
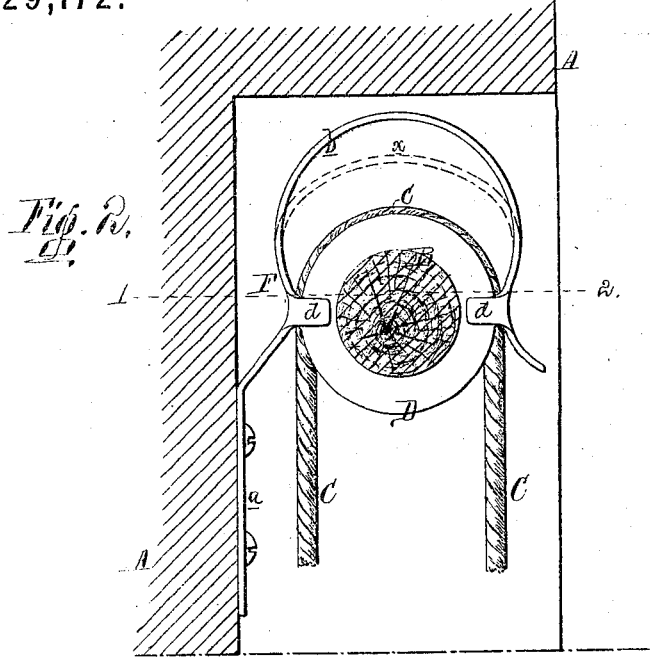
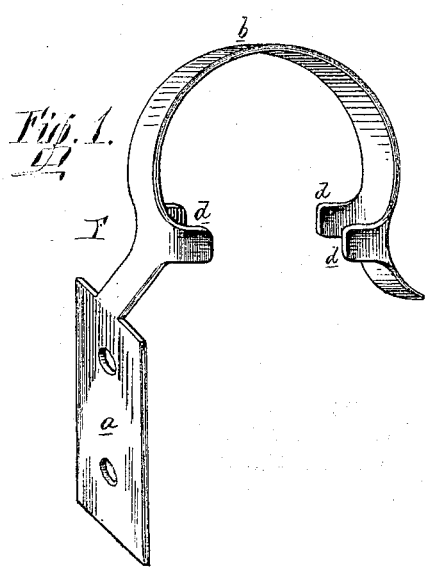
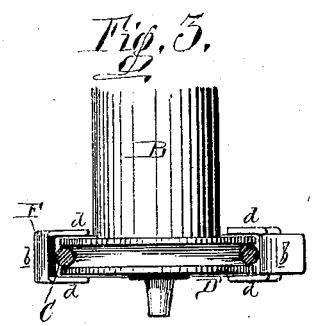
WITNESSES, John Parker
Thos. McIlvain
Anthony Roelofs
By his attys
Howson & Son 129,172

UNITED STATES PATENT OFFICE.

ANTHONY ROELOFS, OF PHILADELPHIA, PENNSYLVANIA

IMPROVEMENT IN CURTAIN-FIXTURES.

Specification forming part of Letters Patent No. 129,172, dated July 16, 1872.

Specification describing a Retaining Device for Shade Rollers and Cords, invented by ANTHONY ROELOFS, of the city and county of Philadelphia, State of Pennsylvania.

My invention consists of a spring-retaining device, arranged to be attached to a window-frame in such a position as to extend over and bind upon opposite sides of a window-shade cord and pulley, as fully described hereafter, thus overcoming the tendency of the shade to become unwound from the roller, preventing the cord from slipping from the pulley, and enabling the usual side rack for tightening the cord to be dispensed with.

In the accompanying drawing, Figure 1 is a perspective view of my improved retaining device; Fig. 2, a side view of the same applied to a window-shade cord and pulley; and Fig. 3, an inverted sectional plan on the line 1, 2, Fig. 2.

A represents part of a window-frame; B, a shade-roller hung to the same in the usual manner; D, the pulley secured to one end of the said roller; C, the operating-cord, adapted to a groove in the roller; and F, the spring-retaining device, which forms the subject of my invention. This retainer consists of a strip of thin steel or brass cut out and bent to the peculiar shape best observed in Fig. 1, so as to form a plate, a, by means of which it can be attached to the window-frame, and a curved or bowed portion, b, which extends over the top of the roller-pulley D, and has sufficient inherent spring to bind or press constantly upon the latter at two opposite points, or, more properly, upon the operating-cord, which passes around the said roller. This pressure is sufficient to retain the cord in the groove of the pulley and to prevent the turning of the roller and consequent letting down of the shade; but it offers no impediment to the free operation of the said roller and shade by the cord, as the retainer yields readily to permit the passage of the latter. As the retainer serves as a brake to hold the roller and shade in any required position, the usual side rack for stretching and tightening the cord will be unnecessary and can be dispensed with. As an additional security to prevent the cord from being thrown out of the groove of the pulley, the retainer is provided with ears $d\ d$, which are so bent as to extend around and partially embrace the edges of the pulley, as best observed in Fig. 3. These ears also bear against the edge of the shade when the latter is wound up unevenly, and prevent the said shade from extending over onto the pulley, which is one of the principal causes of the throwing off of the cord. The retainer bears equally upon opposite sides of the pulley, and does not, therefore, subject the roller-journal to any unequal strain, nor does it interfere with the taking down and putting up of the roller and shade, or prevent the detaching and replacing of the cord. The curved or spring portion $b$ of the retainer may in some cases be flattened, as indicated by the dotted lines $x$, where the height of the window-frame is not sufficient to admit of the use of the full-curved retainer shown in the drawing.

I claim as my invention—

A retainer, consisting of a spring-plate bent and provided with lips or ears $d$, as described.

In testimony whereof I have signed my name to this specification in the presence of two subscribing witnesses.

A. ROELOFS.

Witnesses:
WM. A. STEEL,
JNO. B. HARDING.